Dec. 23, 1969 — H. FOLKERTS — 3,485,512
TRACTOR HITCH FOR TOWED IMPLEMENTS
Filed Feb. 29, 1968 — 2 Sheets-Sheet 2

INVENTOR.
HENRY FOLKERTS
BY
Lindenberg & Freilich
ATTORNEYS.

United States Patent Office 3,485,512
Patented Dec. 23, 1969

3,485,512
TRACTOR HITCH FOR TOWED IMPLEMENTS
Henry Folkerts, Granger, Wash., assignor to Folkert,
Incorporated, Grandview, Wash., a corporation of
Washington
Filed Feb. 29, 1968, Ser. No. 709,240
Int. Cl. B60d 1/00
U.S. Cl. 280—406                                          11 Claims

ABSTRACT OF THE DISCLOSURE

A hitch which increases traction of a tractor pulling a towed implement supported primarily by its own wheels by transferring substantial implement weight and tractor front wheel weight to the rear wheels of the tractor. The hitch comprises a main frame for mounting on the three point tractor lift arms, including a lower attach point for connection to the forward end of an implement tongue. The hitch also includes a pair of adjustable long transfer arms which extend from the top of the main frame to points on the implement near its center of gravity to apply lifting and draft forces to the implement without tilting it.

BACKGROUND OF THE INVENTION

Field of the invention

This invention relates to tractor hitches, and more particularly, to tractor hitches for towed implements which are supported primarily by their own wheels.

Description of the prior art

Weight transfer hitches have been utilized to provide better performance from trailed or mounted implements. The most common type of modern tractors have lift arms usually in a three point configuration and reaction of sensing links actuates a hydraulic system to apply raising forces to the lift arms. The sensing links can be set to only respond when the draft load is more than a preset level. When an implement is coupled to the lift link by a hitch and preset draft load is exceeded, the lifting of the arms against the weight and downsuck of the soil-engaging implement also tend to lift the front end of the tractor and effectively transfer weight to the rear wheels to increase traction and prevent slippage.

The lifting arms help to prevent slippage in two ways. First, the lifting of the front of the implement decreases the depth of the implement in the soil and therefore decreases the draft or pulling load. Second, the lifting of the implement causes more of the implement weight to be carried by the tractor instead of support wheels or the like which may carry some of the implement weight.

As a result of weight transfer from the implement to the tractor, more weight is transferred to the back wheels of the tractor. This increases traction and allows the tractor to pull with more force without the rear wheels slipping. Weight transfer from the implement to the lift arms may also occur and apply a torque which tends to lift the tractor front wheels off the ground and apply their weight to the rear wheels. Thus, the lift arms can allow weight transfer from both the implement and the front wheels to the rear wheels, to greatly increase traction.

In the years following World War II, tractor power has increased without a corresponding increase in tractor weight. Larger and heavier implements followed the introduction of the more powerful tractors. As a result, the problem of increasing traction has become very important.

The lifting of the implement to increase the weight on the rear wheels is effective for the lighter weight implements which can be mounted directly on the tractor to enable it to carry most of the implement weight. However many implements are so large that they must be supported primarily by an independent set of wheels. Such implements are generally referred to as trailing or towed implements. The towed implements are generally provided with long tongues to facilitate turning them. The forwardly directed tongue attaches to the rear of the tractor and has generally been attached directly to the tractor frame or a simple bar fixed to the frame. While the tongue could be attached to the bottom lift arms of the tractor, substantial weight transfer generally was not obtained. Raising of the lift arms will tip the implement and prevent its effective utilization. Furthermore, even such tilting results in only a small weight transfer. There are further problems in steering control and in excessive braking when turning at the end of a field.

OBJECTS AND SUMMARY OF THE INVENTION

Accordingly, it is an object of the present invention to provide a tractor hitch which allows substantial weight transfer when utilized to couple a trailing implement to the hydraulic lift hitch of a tractor.

Another object of the invention is to provide a traction hitch device of the above described type which is simple to fabricate, is readily installed to a three point hydraulic lift system of a tractor and a towed implement to give effective weight transfer with satisfactory control over the tractor and implement.

A further object of the invention is the provision of a traction hitch, which when installed on a tractor to tow an implement, improves tillage, steering and draft while reducing tire slippage, braking, tractor wear, fuel and time.

Yet another object of the invention is to provide a traction hitch that can be left on the tractor for mating with all trailing implements, is ruggedly built and increases the effective draft horse-power of the tractor by 30 to 50%, while trailing implements faster and deeper with less slippage and is capable of trailing bigger units than previous traction hitches.

These and other objects and many attendant advantages of the invention will become readily appreciated as the description proceeds.

In accordance with the present invention, there is provided a tractor coupling hitch which is adapted for use with a towed implement having a forwardly projecting tongue. The hitch includes a vertically positioned main frame which is supported on the three lift arms at the rear of the tractor. Means are provided on the lower end of the frame for attaching the tongue of the implement. A long rigid transfer arm or pair of arms extend from the top of the frame to a point on the implement which is spaced an appreciable distance behind the forward end of the tongue.

The transfer arm of the hitch is positioned to enable the hitch to, in effect, tend to lift the implement from a point near its center of gravity. As a result, a substantial lifting force can be applied without excessively tilting the implement. The tendency to lift the implement results in increased weight on the rear wheels of the tractor. In addition, the lifting force is applied at a point several feet behind the tractor rear wheels, so that a large torque is provided which tends to lift the front wheels of the tractor. This causes a transfer of weight from the front to the rear tractor wheels to further increase traction. The transfer arm allows the upper arm of the three arms at the rear of the tractor to apply substantial pulling or draft, thereby reducing the draft on the two lower lift arms. This provides a canceling out system whereby on lifting of the main frame, the transfer arm is placed in additional tension and contributes a reduction in drawbar pull. Thus, the lower arms will sense this decrease in draft and this tends to limit upward movement of the frame and permit downward movement of the frame once the drawbar force decreases to the preset level.

The novel features of the invention are set forth with particularity in the appended claims. The invention will be better understood from a consideration of the following detailed description when read in conjunction with the accompanying drawings.

BRIEF DESCRIPTION OF THE DRAWINGS

FIGURES 5A through 5C are diagrammatic views showing the forces produced in the operation of the hitch of FIGURE 1.

DESCRIPTION OF THE PREFERRED EMBODIMENTS

Figure 1:
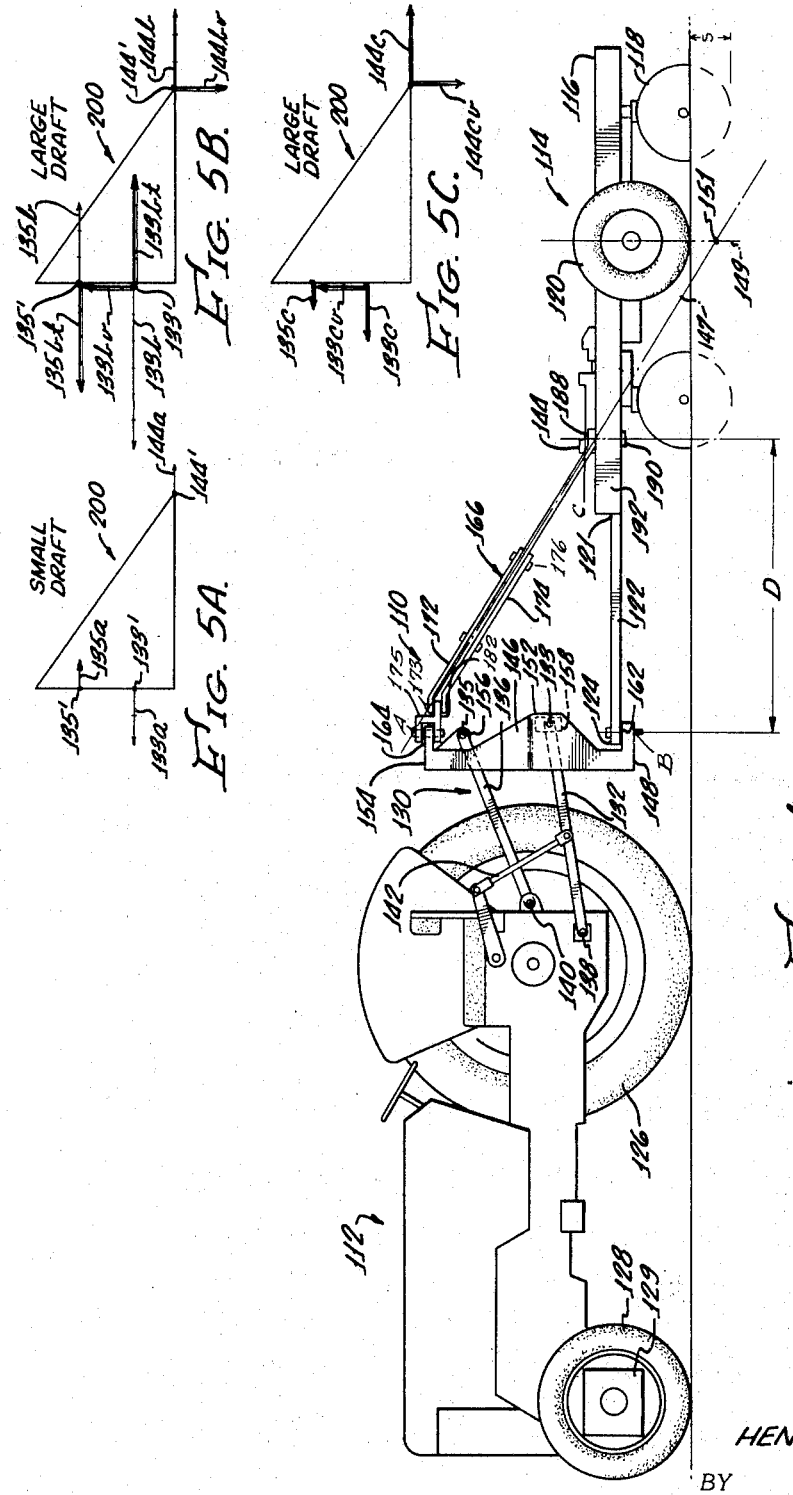
FIGURE 1 is a side elevation view of a hitch constructed in accordance with the invention, showing it connected to a typical tractor and typical trailing-type implement.
Figure 2:
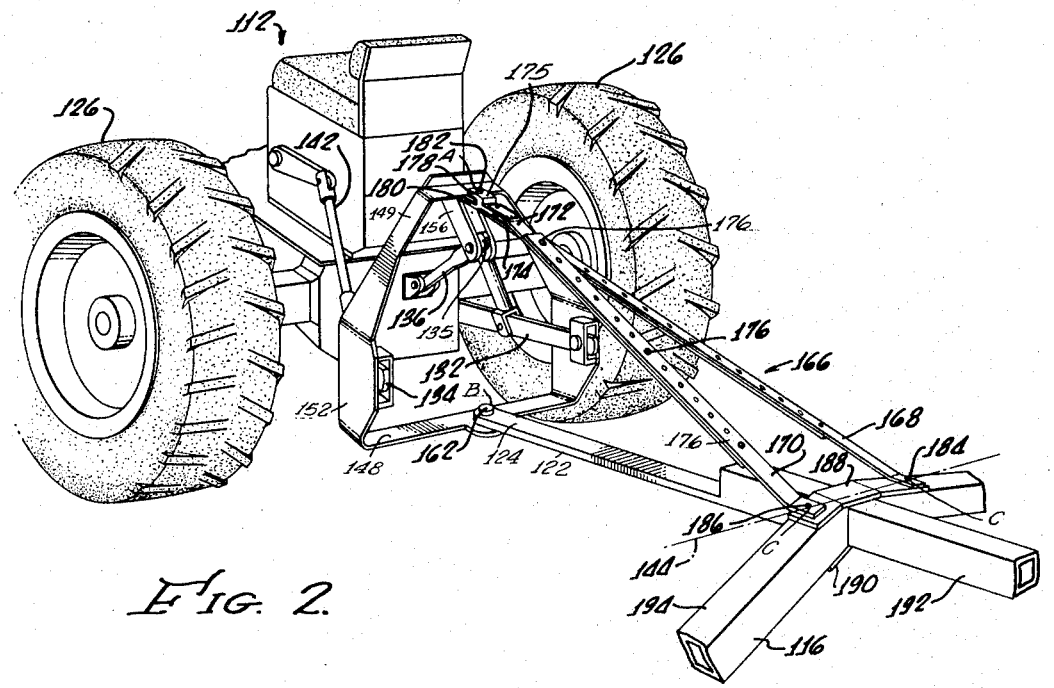
FIGURE 2 is a perspective view of the hitch of FIGURE 1.
Figure 3:
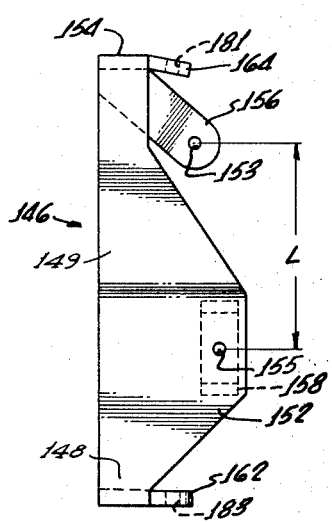
FIGURE 3 is a side elevation view of the main frame of the hitch of FIGURE 1.

FIGURE 1 illustrates the coupling hitch 110 of the invention coupled to the rear end of a tractor 112 for pulling a trailing implement 114. A small trailing implement is shown to facilitate illustration, but the hitch is generally used in connection with a large and heavy trailing implement. The trailing implement 114 includes an implement frame 116 which carries tools such as disc blades 118 and is supported primarily by implement wheels 120. A long tongue 122 has a rearward end 121 connected to the implement frame 116 and has a forward end 124 adapted to be hitched to a tractor. The implement frame remains horizontal without any support from the tractor, and, in fact, many of the heavier trailing implements use two or more sets of wheels to support them on the ground.

The tractor 112 is of a conventional type which includes a pair of rear driving wheels 126 and a pair of front wheels 128. The tractor carries a conventional 3-arm rear lift hitch 130 which includes a pair of lower lift arms 132 and 134 and a top arm 136. The lower lift arms are pivoted at 138 to the tractor frame while the top arm is pivoted at 140 to the frame. The tractor includes a hydraulic lift system which senses the pulling or draft force in the lower lift arms 132 and 134. When this draft force exceeds a preset level, the hydraulic system operates lifting links 142 to raise the two lower lift arms. The lifting force can be set so that it does not exceed a predetermined level, even if this means that no appreciable lifting of the arms occurs.

The coupling hitch 110 is designed to couple the tractor lift hitch 130 to the front end 124 of the implement tongue. However, the coupling hitch also includes a transfer arm assembly 166 for attaching the hitch to the trailing implement at a position 144. The position 144 is spaced a considerable distance D from the forward end 124 of the tongue.

Figure 4:
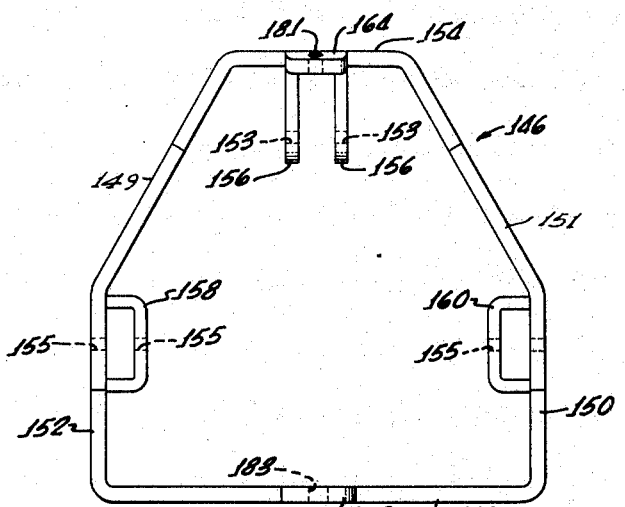
FIGURE 4 is a front elevation view of the main frame of the hitch of FIGURE 1.

As shown in FIGURE 4, the coupling hitch 110 includes a main frame 146 having a lower lateral bar forming a bottom portion 148, two bars at its sides 150 and 152, a pair of angled bars 149 and 151 and a cross bar forming an upper portion 154. A clevis 156 on the upper portion of the frame having holes 153 is adapted to attach to the end 135 of the top arm 136 of the tractor lift hitch. Bearings 158 and 160 with holes 155 at the sides of the hitch are adapted for connection by means of pins to the ends 133 of the lower arms 132 and 134 of the tractor hitch assembly. The main frame also includes a lower hitch bearing 162 for pivotal connection to the hitch point 124 at the forward end of the implement tongue. Another bearing 164 is adapted for connection to the transfer arm assembly 166 which extends between the top of the main frame and the implement frame.

The transfer arm assembly 166 comprises a pair of lower transfer arms 168 and 170 and a pair of upper transfer arms 172 and 174. One upper and one lower transfer arm 170 and 172 are connected together by three bolts 176 which extend through holes in the arms. A similar set of three bolts connects the other lower and upper arms 168 and 174. The transfer arms have many holes spaced along their length to enable the effective lengthening or shortening of the transfer arm assembly, by removing three bolts, repositioning the arms in different relative longitudinal positions, and refastening the bolts. This permits the use of the hitch and arms with a variety of different trailed implements.

The upper transfer arms 172 and 174 are connected at 173 to a bracket 175 having bearing holes 178 and 180 for receiving a shaft 182 that extends through them and through the hole in the bearing 164 at the top of the main frame. This provides a swivel joint between the transfer arm assembly and the main frame and permits various angular displacement of the arms. The lower ends of the lower transfer arms 168 and 170 have bearing holes 184 and 186 for attachment to the implement frame 116 at a point rearward of the tongue 122. The attachment is made by bolts which pass through the bearing holes 184 and 186 and through bracing plates 188 and 190 on the implement frame. A particular implement frame 116 is shown having a longitudinal beam 192 which extends in line with the tongue 122, and which includes a cross-beam 194 that passes across the longitudinal beam. Of course, a variety of other types of implement frames may be encountered, and the transfer arms can be positioned at any angle within a wide range to enable attachment of the bearing holes 184 and 186 to points spaced on opposite sides of the center line of the frame.

The coupling hitch 110 enables the tractor to not only pull the trailing implement 114, but to exert a substantial upward force without excessively tipping the implement. It can be appreciated that if the transfer arm assembly 166 were not present, an upward force on the forward end 124 of the tongue would tend to tilt the implement so as to lift up the tongue end while lowering the rear end of the implement. Because of the substantial length of the tongue, it acts as a long moment arm, and only a reltively small lifting force at 124 can cause excessive tipping. The transfer arm assembly essentially allows the lifting force to be applied from a point near the center of gravity of the implement. This is because the transfer arm is attached at 144 which is spaced a considerable distance D from the forward end of the tongue.

In order to utilize the coupling hitch of the invention for a three-arm tractor with bottom sensing arms, the coupling hitch of the invention and implement are attached in the manner shown with the transfer arm bearing shaft 182 in vertical alignment with the tongue bearing 162. The hitch is preferably installed at a height which places the bottom lift arms at the approximate center of travel allowing for maximum movement, both upward and downward. The hydraulic controls of the tractor are set to cause lifting of its lower lift arms 132 and 134 when a draft, or pulling force, of more than a set amount is sensed by these arms. The controls are usually set at about mid-point of their demand for power. In field use and in crossing ditches, waterways or dead furrows, the hitch should be used with the tractor three point system in draft, load and depth or load control. The position or depth control should not be utilized. It is not necessary to put the lift-lower control lever in a raised position any time. While traveling or turning at the end of a field, only the trailing implement is raised and not the three point system with the traction hitch attached.

When the tractor is stationary, the weight of the trailing implement 114 will be supported substantially only by its implement wheels 120 and any tools such as the disc blades 118 that bear on the ground. As the tractor pulls the implement 114, the implement will produce a drag and a draft force will be sensed in the lower arms 132. When this draft exceeds the set amount, the lower arms 132 and 134 will be raised.

Top link is screwed in or out to vertically align points A and B. The transfer sensing arms 166 are attached to point A on the traction hitch and points C on the trailing implement. The lift on controls are placed in a traction booster position at about mid-way of the demand for power. When the tractor is in motion pulling its load, more or less pressure can be placed on the rear tires by movement of the traction booster lever. The hitch should be installed at a height that will put the lifting arms at the approximate center of their travel allowing for maximum motion both upwards and downwards.

Th raising of the lower arms 132 and 134 results in the transfer arm assembly 166 applying a lifting force to the trailing implement at the position 144, which is along a line where the bearings with holes 184 and 186 are attached to the implement frame. A substantial lifting force is transferred through the transfer arm assembly 166 without substantial tilting of the trailing implement. Any tendency of the implement to tilt occurs not about the implement wheels 120, but rather about the forward end 124 of the tongue. The tongue 122 may be in compression, while the draft or pulling force is transmitted through the transfer arms 166.

As a result of the lifting of the implement at the position 144, weight is transferred from both the trailing implement 114 and from the front wheels 128 to the rear driving wheels 126 of the tractor. The weight transfer from the trailing implement to the tractor is due simply to the lifting force applied to the trailing implement. The transfer of weight from the front wheels 128 to the rear driving wheels is due to the large torque caused by the application of lifting forces at the position 144 which is spaced a considerable distance from the rear driving wheels 126. This torque tends to rotate the tractor in a direction to lift the front wheels 128, and therefore, it applies a portion of the weight ordinarily supported by the front wheels to the rear wheels.

An understanding of the forces applied to the tractor through the coupling hitch 110 can be gained by considering the force or free body diagrams of FIGURES 5A through 5C. These diagrams show the forces on a hitch body 200 comprising the coupling hitch 110, including the main frame and transfer arms, and the tongue 122, under various conditions. FIGURE 5A shows the forces 133a, 135a and 144a on the hitch body 200 when the tractor first starts to pull the implement. The forces are applied at the points 133', 135' and 144', which represent the points 133, 135 and 144 on the hitch. The implement applies a force 144a, and the hitch body applies forces 133a and 135a to the tractor to establish a zero net force and torque on the hitch body. It is assumed that the force 133a is slightly smaller than a preset draft level required to activate the lift arms of the tractor hydraulic system.

When the implement tools encounter hard soil or otherwise are made to react strongly with the ground, the draft increases to an amount shown at 144b in FIGURE 5B. If the lower lift arms did not apply an upward or lifting force at 133', the forces 133b and 135b would result. However, as the force 133b increases past the preset draft level, which is of a value shown at 133a, the lower arms are raised, and the vertical force 133bv is also applied at the point 133'. This results in the slight raising of the hitch body 200 and the application of a lifting force to the trailing implement at the point 144'. The trailing implement therefore applies a downward force 144bv, representing part of its weight, to the hitch body at the point 144'.

The two vertical forces 133bv and 144bv exactly cancel. However, they establish a large clockwise torque which must be counteracted. This torque is counteracted by the horizontal forces 133bt and 135bt at the points 133' and 135', respectively. FIGURE 5C shows the resultant forces which are the sum of those forces shown in FIGURE 5B.

The tractor must supply the forces 133c, 133cv, and 135c, shown in FIGURE 5C. The force 133cv represents an additional weight applied to the tractor wheels to increase traction. The application of the force 133cv is several feet behind the rear driving wheels of the tractor so it additionally sets up a torque tending to lift the front wheels 128 of the tractor and applies additional weight to the rear driving wheels. In addition, the torque resulting from the separation between the points of application of the forces 133c and 135c tends to turn the tractor clockwise, and therefore, also lifts the front wheels 128 and applies the weight they are carrying to the rear driving wheels. Thus, the traction of the rear driving wheels 126 is increased greatly by a portion of the weight of the trailing implement 114 and a portion of the weight otherwise carried by the front wheels 128. This additional traction is applied only as the draft of the trailing implement increases, as when harder soil is encountered.

It should be noted that the trailing implement 114 is generally not raised appreciably, since insufficient lifting force is applied for this purpose. Also, the implement is not appreciably tilted, partially because the lifting force is applied relatively close to the center of gravity of the implement. (In addition, a downwardly directed force may be applied to the forward end 124 of the tongue.) When a softer soil is encountered, or the earth-contacting tools of the implement are raised, substantially no weight transfer occurs. As a result, increased traction of the front wheels 128 is obtained to aid in steering and permits turning at the end of a field without overuse of tractor brakes. In order to obtain a maximum rear wheel traction when maximum loads are pulled, weights 129 may be added to the front wheels, and the hydraulic system of the tractor is set to allow a large lifting force to be applied.

Instead of applying the lifting forces to the implement rearwardly of the tongue, they could be applied at a point along the tongue. However, this would result in a much greater lifting force in the transfer arm assembly and much greater downward force at the forward end of the tongue. The bending stress in the tongue would be so great that it would break for even moderate weight transfer. Accordingly, it is desirable to apply the upward forces rearwardly of the tongue, and the transfer arm assembly is made longer than the implement tongue. In order to prevent excessive tension in the transfer arm assembly, and to limit the forces applied to it at 144, it hould extend at a large angle from the horizontal. This is accomplished by using a main frame wherein the vertical separation of the lower and upper bearing holes 181 and 183 is twice the vertical separation L of the attach points 153 and 155 on the main frame. In this connection it will be noted that the hitch point 182 of the transfer arm assembly 144 is located higher on the main frame 146 than the hitch point 153 for the upper tractor arm or link 136.

The transfer arm assembly can be set to a variety of lengths. An optimum length for most conditions is a length which results in the center of draft of the implement being slightly below ground level. This is accomplished by a transfer arm length wherein its extension, as shown by the line 147, crosses a vertical line 149 through the center of gravity of the implement, at a point 151 which is at approximately half the depth S of the tools such as the disc blades 118. This results in a center of draft at the point 151, which is the center of draft-creating forces, namely the reaction of the soil on the tools. With the center of draft at this point, the implement has a minimum tendency to pitch. Otherwise, pitching would occur when a rock or hard soil section was encountered. The draft occurs at the point 151 because a major portion of the draft is transferred through the transfer arm assembly 166 at heavy draft loads, rather than through the tongue 122. The adjustability of the length of the transfer arms enables the coupling hitch to be used with a variety of towed implements.

While a single transfer arm pair, including one lower and one upper arm, would be used to achieve weight transfer, there is often no place available on the center of the implement frame at which to attach the rearward end of the transfer arm assembly. Thus, two of such pairs are generally provided, one attached on each side of the implement center. The use of two spread transfer arms can also reduce pitching of the implement from side to side when the tools of the implement are subjected to unequal soil conditions.

The hitch of the invention makes the equivalent of a 4-wheel drive unit out of a tractor by increasing its effective draft horse-power 30% to 50%, thereby increasing and improving tillage. Also, trailing implements can be pulled faster and deeper with less slippage, less tire wear and noticeably less fuel. Pulling bigger units, wider chisel plows, and wider field cultivators, one or two more plow bottoms, bigger combines and pea and potato harvesters becomes possible.

The hitch of the invention entirely obviates rear wheel weights, tire fluid and dual tires where flotation is no problem. Even smaller tractors equipped only with 400 to 700 pounds of front weights and the inventive hitch will out-pull larger tractors equipped with rear wheel weights, dual tires and tire fluid.

Trailing implements can now be matched with rated tractor horse-power because the traction is placed where needed, that is on the rear wheels. The weight transfer is so remarkable that improved traction is noticed even when pulling a wagon on an icy road.

Although particular embodiments of the invention have been described and illustrated herein, it is recognized that other modifications and variations may readily occur to those skilled in the art.

What is claimed is:

1. A tractor hitch for coupling a towed implement to a tractor, said implement being supported primarily by its own wheels and having a tongue, comprising:
   a main frame having upper and lower portions and spaced side portions, said frame having tractor attaching bearing means on each of said side portions and on said upper portion for attachment to said tractor, and having implement attaching bearing means substantially at the center of said lower portion for attachment of said tongue of said towed implement and at said upper portion; and
   elongated transfer arm means having a first end portion for coupling to said implement attaching bearing means at said upper portion of said main frame and a second end portion for coupling to said implement;
   the vertical distance between said tractor attachment bearing means at said upper and side portions being substantially smaller than the vertical distance between said implement attaching bearing means at said upper and lower portions so that the transfer arm means extend at a relatively large angle from the horizontal, said implement and tractor attaching bearing means at said upper portion each having a hitch point with the hitch of the said implement attaching bearing means being uppermost.

2. A tractor hitch as defined in claim 1 wherein:
   said transfer arm means comprises a pair of elongated members, each having a second end for attachment on a laterally opposite side of said implement and a first end; and including
   means for pivotally connecting said first ends of said members to said implement attaching bearing means at said upper portion of said main frame.

3. A tractor hitch for attaching a towed implement with a forwardly extending tongue to a tractor with hitch arms extending behind it comprising:
   a main frame having a plurality of hitch points for attachment of said arms of said tractor, including upper and lower points vertically spaced at a first predetermined distance, a lower hitch bearing for receiving said tongue, and an upper hitch bearing, said bearings being vertically spaced by a distance substantially greater than said first predetermined distance so that the transfer arm means extend at a relatively large angle from the horizontal; and
   transfer arm means having a length which is longer than the length of said tongue, said transfer arm means having a forward end for attachment to said upper hitch bearing and a rearward end for attachment to said implement said upper hitch bearing being disposed above said upper hitch point.

4. A tractor hitch as defined in claim 3 wherein:
   said transfer arm means comprises a pair of members having a forward end pivotally joined to said upper hitch bearing and having laterally spaced rearward ends for attachment to laterally opposite sides of said towed implement.

5. A tractor hitch for attaching a towed implement to a tractor comprising:
   a towed implement having a tongue and plurality of wheels for supporting substantially its entire weight on the ground, said implement having a predetermined center of gravity;
   a hitch comprising a main frame for attachment to hitch arms of said tractor, said main frame having a lower bearing and means for attaching said lower bearing to the forward end of said tongue of said implement and having an upper bearing; and
   a transfer arm assembly extending between said upper bearing of said main frame and at least one point on said towed implement which is closer to the center of gravity of said implement than the forward end of said tongue of said implement.

6. A tractor hitch as defined in claim 5 wherein:
   said towed implement includes at least one soil engaging tool for projection below the level of said wheels of said implement; and
   said transfer arm assembly comprises an elongated member which extends along a line that intersects a vertical line through the center of gravity of said implement at a point between the bottom of said implement and the deepest projection of said tools below the bottom of said wheels.

7. A tractor hitch for attaching a towed implement with a forwardly extending tongue to a tractor with hitch arms extending behind it comprising:
   a main frame having an upper hitch point for connection to a top arm of said tractor, a pair of lower hitch points spaced a predetermined vertical distance from said upper hitch point for connection to a pair of lower arms of said tractor, a lower hitch bearing for receiving said tongue, and an upper hitch bearing, the vertical distance between said upper and lower hitch bearings being at least twice as great as said predetermined vertical distance; and
   a transfer arm assembly having a length which is longer than the length of said tongue, said transfer arm assembly having a forward end for attachment to said upper hitch bearing and a rearward end for attachment to said implement.

8. A tractor hitch for attaching a towed implement with a forwardly extending tongue to a tractor with hitch arms extending behind it comprising:
   a main frame including
      a lower lateral bar,
         a pair of side bars extending upwardly from opposite sides of said lower lateral bar.

a pair of angled bars having lower ends coupled to the top of said side bars and extending upwardly and angled toward each other, an upper cross bar joining the upper end of said angled bars, a pair of bearings formed on the side bars for attachment to lower arms of said tractor, an upper bearing bar having an upper end attached to said upper cross bar, said upper bearing bar depending in a generally downward direction from said upper cross bar and having a lower end forming a bearing for attachment to an upper arm of said tractor, means defining a lower hitch bearing for receiving said tongue, and means defining an upper hitch bearing; and a transfer arm assembly having a length which is longer than the length of said tongue, said transfer arm assembly having a forward end for attachment to said upper hitch bearing and a rearward end for attachment to said implement.

9. A tractor hitch for attaching a towed implement with a forwardly extending tongue to a tractor with hitch arms extending behind it comprising:

a main frame having a plurality of hitch points for attachment to said arms of said tractor, a lower hitch bearing for receiving said tongue, and an upper hitch bearing;

a towed implement having a frame, tools mounted on said frame for projecting into soil, and wheels mounted on said frame for supporting substantially the entire weight of said frame on the surface of the soil; and transfer arm means including an elongated member with a forward end for attachment to said upper hitch bearing and a rearward end for attachment to said implement, said member extending along a line which intersects a vertical line through the center of gravity of said implement at a point located below the bottom of said wheels on said implement and above the deepest part of said tools.

10. A tractor hitch for coupling a towed implement with a forwardly directed tongue to a tractor comprising:

a main frame for substantially vertical orientation including;

an elongated bottom member with an implement attaching bearing substantially at its center for pivotal connection to the tongue of an implement;

a pair of side members extending upwardly from opposite sides of said bottom member, said side members having bearings for attachment to a pair of lower arms of said tractor;

an upper member extending between said side members, said upper member having tractor attaching means for attachment to an upper arm of said tractor and having implement attaching means; and a transfer arm assembly for extension between said implement attaching means on said upper member and positions on said implement located rearwardly of said tongue of said implement;

the vertical distance between said implement attaching means on said upper member and said implement attaching bearing on said lower member being at least twice as great as the vertical separation between said tractor attaching means for attachment to an upper arm of said tractor and any one of said bearings on said side members.

11. A tractor hitch for coupling a towed implement to a tractor having one upper and two lower lift arms, said implement being supported primarily by its own wheels and having a tongue, comprising:

a main frame upper and lower portions and spaced side portions, said frame having three-point tractor attaching bearing means providing a hitch point at said upper portion for attachment to said upper lift arm and two lower hitch points for attachment to each of said lower lift arms, said frame further having implement attaching bearing means substantially at the center of said lower portion providing a hitch point for attachment of said tongue of said towed implement and having implement attaching bearing means at said upper portion including a hitch point located in a plane above the hitch point of said upper lift arm; and elongated connecting means having a first end portion for coupling to the hitch point of said implement attaching bearing means at said upper portion of said main frame and having a second portion for coupling to said implement, the vertical distance between the hitch points of said tractor attachment bearing means for said upper and lower lift arms being substantially smaller than the vertical distance between the hitch points of said implement attaching bearing means at said upper and lower frame portions so that the elongated connecting means extends at a relatively large angle from the horizontal.

References Cited

UNITED STATES PATENTS 2,247,534  7/1941  Schlegell _____ 172—7
3,269,748  8/1966  Mazery _____ 280—405

FOREIGN PATENTS 1,430,633  1/1966  France.
87,084  3/1956  Norway.

LEO FRIAGLIA, Primary Examiner

U.S. Cl. X.R.
172—248; 280—415